United States Patent
Jordan et al.

(10) Patent No.: US 10,344,675 B2
(45) Date of Patent: Jul. 9, 2019

(54) FASTENER AND METHOD OF RESTRICTING FLUID FLOW USING SAME

(71) Applicant: Rolls-Royce Corporation, Indianapolis, IN (US)

(72) Inventors: Matthew Joseph Jordan, Indianapolis, IN (US); Dennes Kyle Burney, Indianapolis, IN (US); Robert Warren Heeter, Noblesville, IN (US); Jonathan Rivers, Indianapolis, IN (US)

(73) Assignee: ROLLS-ROYCE CORPORATION, Indianapolis, IN (US)

( * ) Notice: Subject to any disclaimer, the term of this patent is extended or adjusted under 35 U.S.C. 154(b) by 477 days.

(21) Appl. No.: 15/165,731

(22) Filed: May 26, 2016

(65) Prior Publication Data

US 2017/0342906 A1 Nov. 30, 2017

(51) Int. Cl.
*F01D 25/24* (2006.01)
*F02C 7/20* (2006.01)
(Continued)

(52) U.S. Cl.
CPC .............. *F02C 7/20* (2013.01); *F01D 25/24* (2013.01); *F01D 25/243* (2013.01);
(Continued)

(58) Field of Classification Search
CPC .......... F02C 7/20; F01D 25/24; F01D 25/243; F01D 25/246; F01D 21/045; F01D 25/265; F16B 35/041
See application file for complete search history.

(56) References Cited

U.S. PATENT DOCUMENTS 6,382,905 B1 * 5/2002 Czachor ............... F01D 11/122
  415/128
2005/0238423 A1 10/2005 Maffre
(Continued)

FOREIGN PATENT DOCUMENTS

DE 102014222060 5/2016
JP S59 203811 11/1984

OTHER PUBLICATIONS

Extended European Search Report (EESR) for counterpart European Patent Application No. 17170537.9 dated Sep. 27, 2017, Applicant, Rolls-Royce Corporation (10 pages).

*Primary Examiner* — Justin D Seabe
*Assistant Examiner* — Sabbir Hasan
(74) *Attorney, Agent, or Firm* — McCracken & Gillen LLC

(57) ABSTRACT

According to one aspect, an apparatus includes a first member that has a first aperture and a second member adjacent to the first member and having a second aperture extending between opposed first and second faces of the second member and aligned with the first aperture to define a combined aperture that has a longitudinal extent. The second aperture is defined by a surface that has a portion having an extent transverse to the longitudinal extent. The apparatus further includes at least a portion of a fastener disposed in the combined aperture. The fastener has a first end proximal the first member and a second end proximal the second member and includes a first retaining member in contact with the first member, a second retaining member in interfering relationship with the portion, and a third retaining member in contact with the second face.

20 Claims, 7 Drawing Sheets

(51) Int. Cl.
*F02C 3/04* (2006.01)
*F16B 35/04* (2006.01)
*F01D 11/12* (2006.01)

(52) U.S. Cl.
CPC .............. *F01D 25/246* (2013.01); *F02C 3/04* (2013.01); *F16B 35/041* (2013.01); *F01D 11/122* (2013.01); *F05D 2220/36* (2013.01); *F05D 2260/31* (2013.01); *F05D 2260/311* (2013.01); *Y02T 50/672* (2013.01)

(56) References Cited

U.S. PATENT DOCUMENTS

| | | | |
|---|---|---|---|
| 2014/0023490 A1 | 1/2014 | Hillier | |
| 2015/0110628 A1* | 4/2015 | Bouchard | ............... F01D 5/066 416/198 A |

* cited by examiner

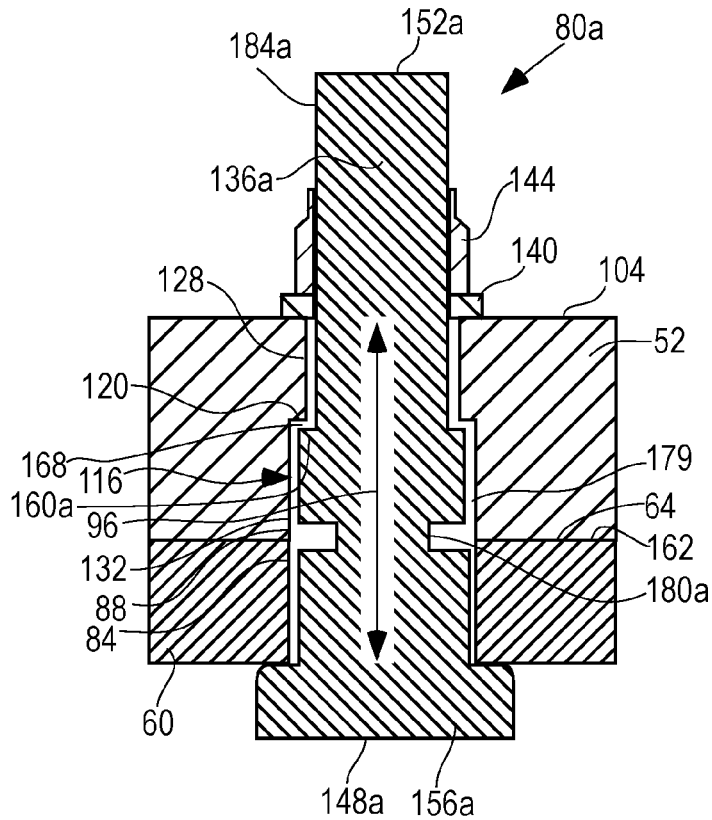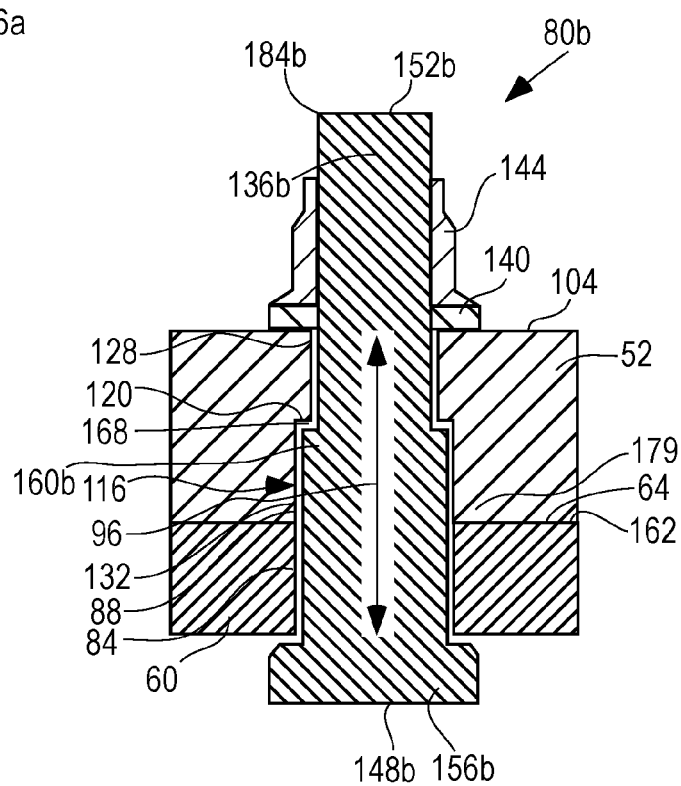

US 10,344,675 B2

FASTENER AND METHOD OF RESTRICTING FLUID FLOW USING SAME

FIELD OF DISCLOSURE

The present subject matter relates to fasteners and rotating structures that move a fluid.

BACKGROUND

Two bodies adjacent to one another may be secured to one another using a fastener, such as a bolt or a screw, that extends through an aperture formed in the two bodies. Under certain circumstances, particularly in an environment in which components proximal the bodies are rotating, a portion of the fastener may experience stress, and as a result, break off or shear. One problem in such a case is that the two bodies may become unsecured from one another resulting in damage to one or both of the two bodies.

Another problem with currently available fasteners is that when a portion of the fastener is broken off, the fastener may be ejected from the aperture. Without the fastener as an obstacle, air or another fluid is able to flow through the aperture in a relatively unrestricted manner, which may be undesirable, for example, because the such air flow may promote or increase the intensity of a hazardous fire.

SUMMARY

According to one aspect, an apparatus includes a first member that has a first aperture. The apparatus further includes a second member adjacent to the first member. The second member has a second aperture extending between opposed first and second faces of the second member. The second aperture is aligned with the first aperture to define a combined aperture that has a longitudinal extent. The second aperture is defined by a surface that has a portion. The portion has an extent transverse to the longitudinal extent. The apparatus further includes at least a portion of a fastener disposed in the combined aperture. The fastener has a first end proximal the first member and a second end proximal the second member. The fastener includes a first retaining member in contact with the first member, a second retaining member in interfering relationship with the portion of the surface defining the second aperture, and a third retaining member in contact with the second face.

According to another aspect, an apparatus includes a first member that has a first aperture. The apparatus further includes a second member adjacent to the first member. The second member has a second aperture extending between opposed first and second faces of the second member. The second aperture is aligned with the first aperture to define a combined aperture that has a longitudinal extent. The second aperture is defined by a surface that has a portion. The portion has an extent transverse to the longitudinal extent. The apparatus further includes at least a portion of a fastener disposed in the combined aperture. The fastener has a first end proximal the first member and a second end proximal the second member. The fastener includes a first retaining member in contact with the first member, a second retaining member in interfering relationship with the portion of the surface, and a third retaining member in contact with the second face. At least one of the first and third retaining members includes a nut.

According to yet another aspect, a method of securing a first member to a second member includes providing a first member having a first aperture. The method further includes providing a second member that has a second aperture such that the first aperture is aligned with the second aperture. The method further includes securing the first member to the second member by a fastener that extends through the first and second apertures. The method further includes restricting, by the fastener, fluid flow through the second aperture such that the fluid flow through the second aperture remains at least partially restricted when the first member separates from the second member.

Other aspects and advantages will become apparent upon consideration of the following detailed description and the attached drawings wherein like numerals designate like structures throughout the specification.

BRIEF DESCRIPTION OF THE DRAWINGS

FIGS. 5, 6, 7, and 8 are views similar to FIG. 4 of other embodiments of a fastener.

DETAILED DESCRIPTION

Figure 1:
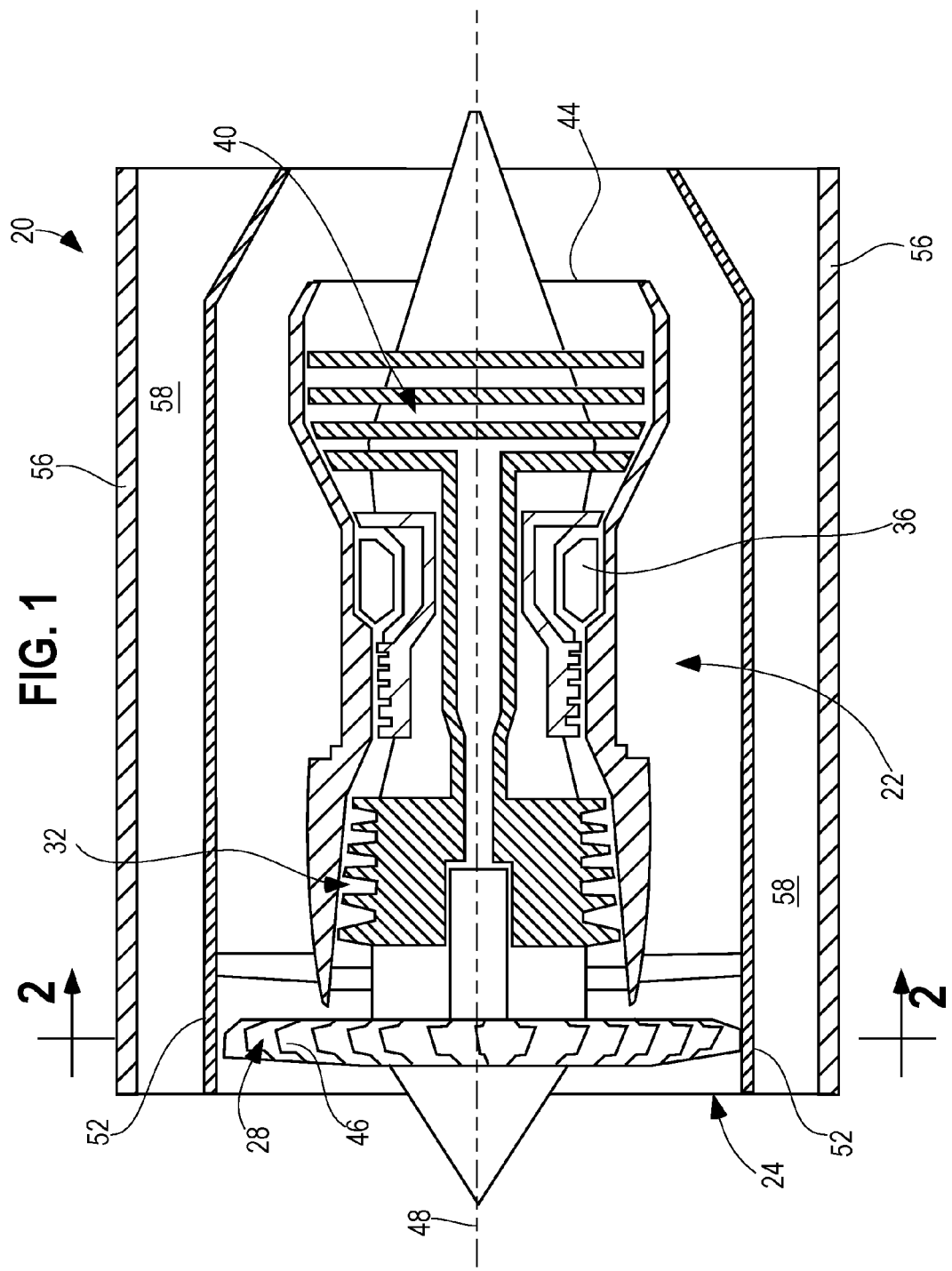
FIG. 1 is a diagrammatic side view, partially in section, of an exemplary rotating structure in the form of a gas turbine engine.

Referring now to FIG. 1, an exemplary rotating structure in the form of a gas turbine engine 20 includes a core section 22 that includes an intake 24, a fan 28, a compressor 32, a combustion chamber 36 that receives compressed air from the compressor 32, a turbine 40 that converts rapidly expanding combusting fuel and air into rotary motive power, and an exhaust 44. The fan 28 includes a plurality of fan blades 46 and rotates about a central longitudinal axis 48 of the turbine engine 20. As further shown in FIG. 1, the turbine engine 20 includes an inner casing 52 that at least partially encloses the core section 22. The inner casing 52 is, in turn, at least partially enclosed by an outer casing 56 of the turbine engine 20. In this way, there exists a space 58 between the inner casing 52 and the outer casing 56. Optionally, the inner casing 52 is made of metal and the outer casing 56 is made of composite material.

Figure 2:
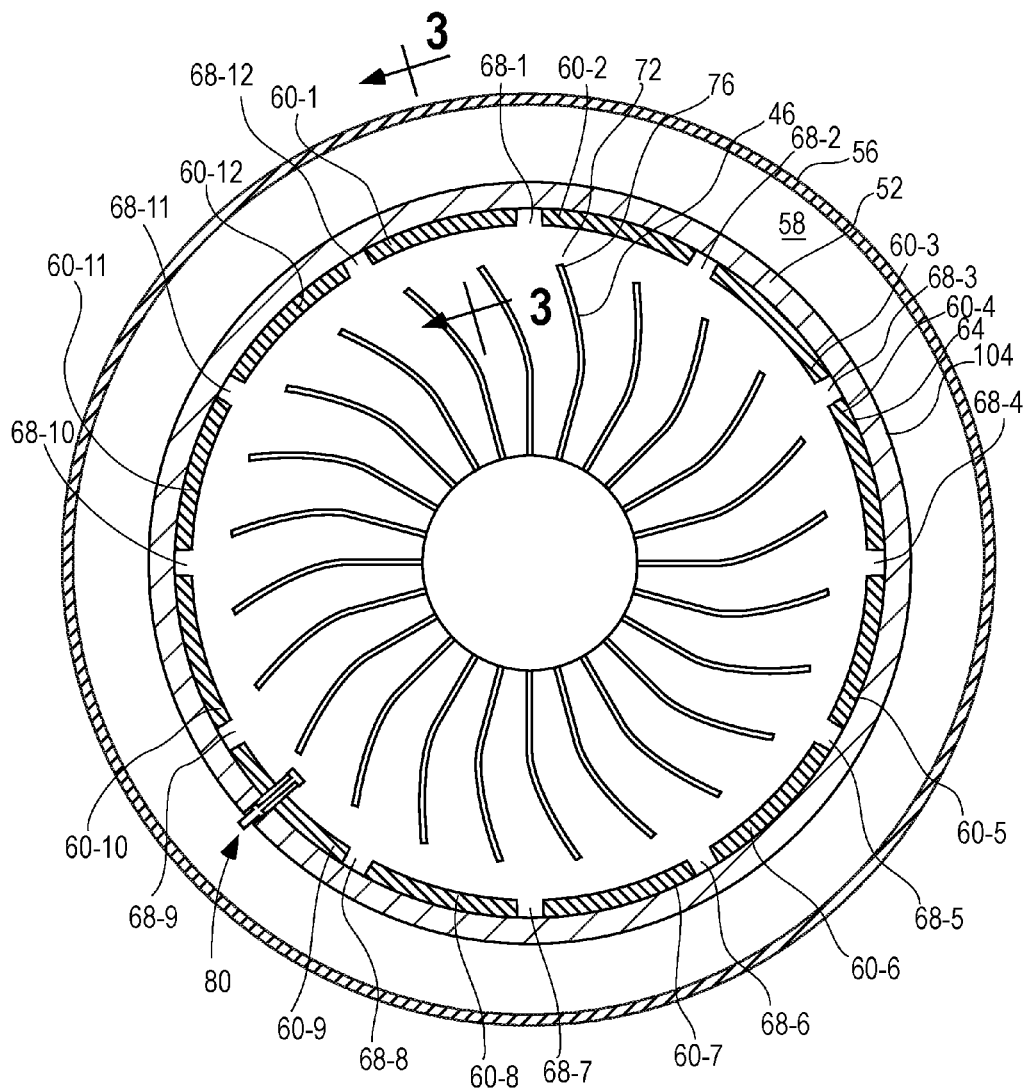
FIG. 2 is a fragmentary enlarged cross sectional view taken generally along the lines 2-2 of FIG. 1.
Figure 3:
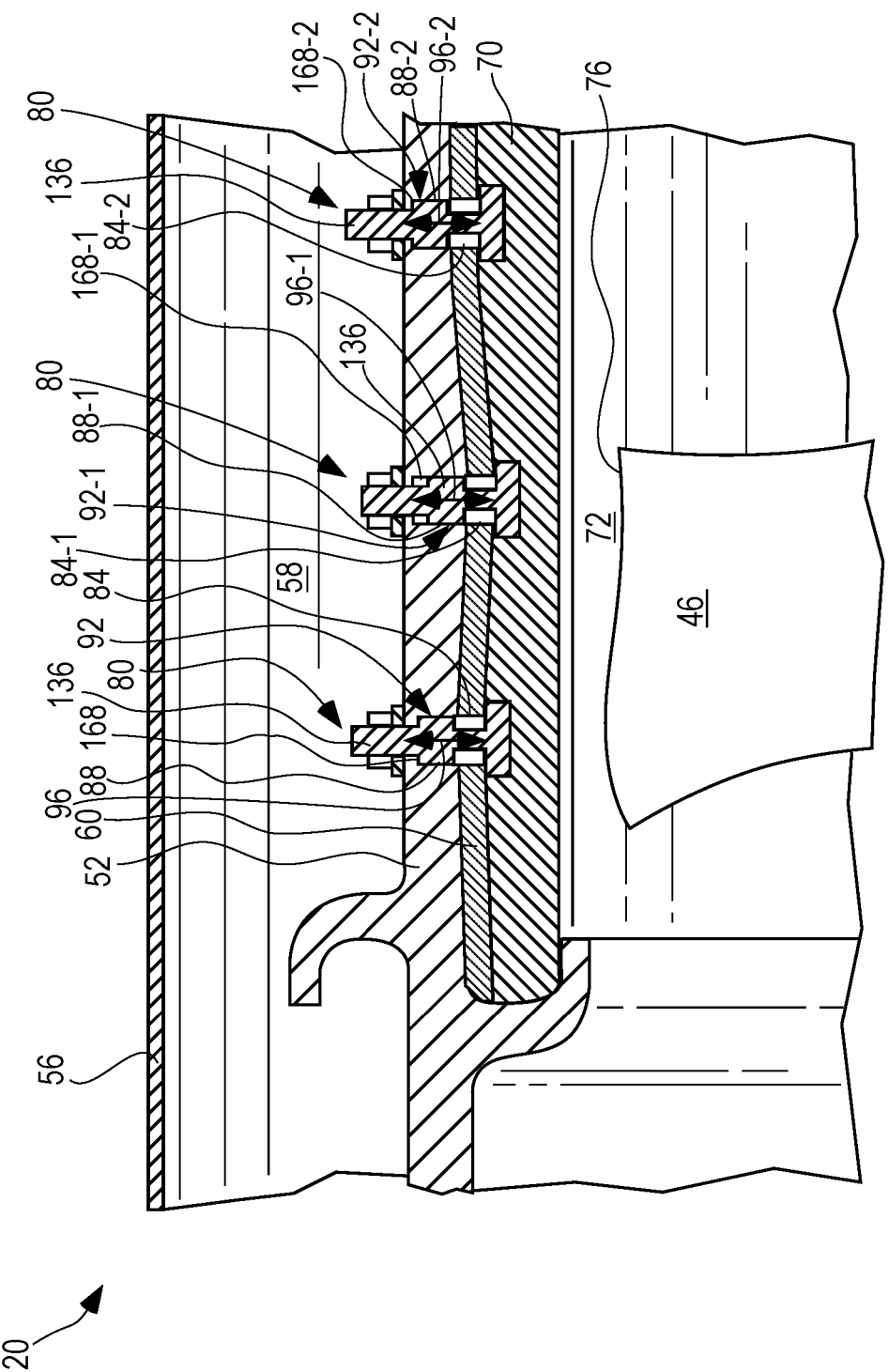
FIG. 3 is a fragmentary enlarged cross sectional view taken generally along the lines 3-3 of FIG. 2.

As shown in FIG. 2, spaced panels 60-1 through 60-12 surround the fan 28 and are disposed on a radially inner surface 64 of the inner casing 52 and are secured thereto. Each panel 60 is spaced from adjacent panels 60 by gaps 68 such that twelve gaps 68-1 through 68-12 are defined between the twelve panels 60-1 through 60-12. Optionally, another number of spaced panels 60 may surround the fan 28. As shown in FIG. 3, a layer 70 of abradable material is disposed on and secured to a radially inward facing surface of each panel 60. The material of the layers 70 is capable of being at least partially rubbed-away or scraped off by contact with a rotating fan blade 46 during engine break-in or normal operation of the engine 20. Thus, a radial gap 72 between a radially outer end 76 of the fan blade 46 and the layers 70 is minimized, thereby improving the efficiency of the engine 20.

As further shown in FIG. 3, each panel 60 is secured to the inner casing 52 by a fastener 80. Referring again to FIG. 3, the fastener 80 extends through aligned apertures 84, 88 in the panel 60 and the inner casing 52, respectively. In the illustrated embodiment, each panel 60 is secured by five rows of fasteners 80 wherein each row is parallel to the central longitudinal axis 48 (only one fastener 80 is shown in FIG. 2 for clarity) and three columns of fasteners 80 each disposed perpendicular to the rows (shown in FIG. 3), for a total of fifteen fasteners 80 per panel 60. Thus, there are a total of 180 fasteners about the fan 28 to secure the twelve panels 60 about the fan 28. Optionally, a different number of fasteners 80 per panel 60 may be utilized.

Figure 4:
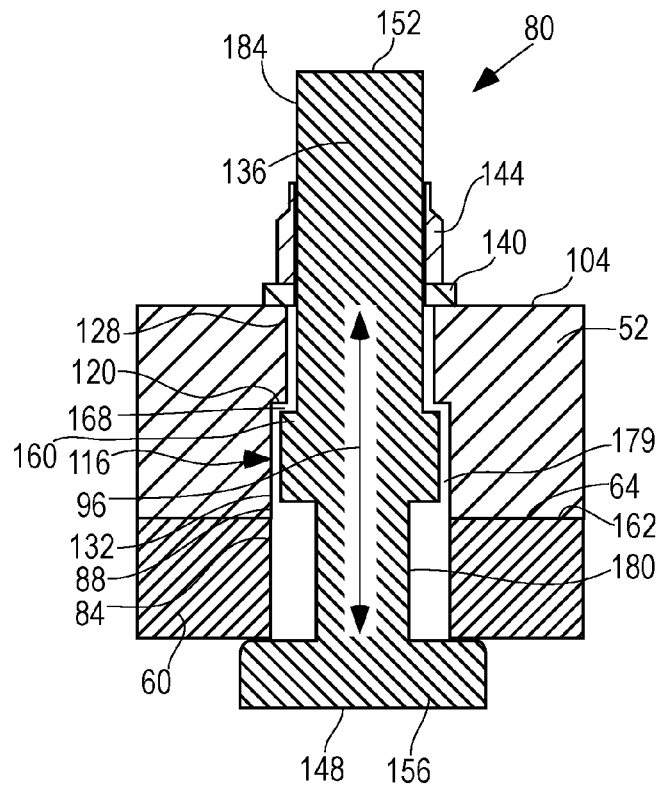
FIG. 4 is a fragmentary cross sectional view of a fastener extending through first and second members, such as the first and second members of FIG. 3.

As further shown in FIG. 4, the alignment of each aperture 88 with one of the apertures 84 defines a combined aperture 92 having a longitudinal extent 96. More specifically, each aperture 88 in the inner casing 52 extends between a first face in the form of the inner surface 64 and a second face in the form of an outer surface 104 and is defined by a surface 116. The surface 116 includes a first portion 120, a second portion 128, and a third portion 132. The first portion 120 has an extent transverse to the longitudinal extent 96, as shown in FIG. 4. The second portion 128 has a longitudinal extent at least substantially coincident with the longitudinal extent 96 and disposed between the first portion 120 and the outer surface 104. The third portion 132 has a longitudinal extent at least substantially coincident with the longitudinal extent 96 and is disposed between the first portion 120 and the inner surface 64 of the inner casing 52.

As further shown in FIG. 4, the fastener 80 is a bolt-nut type assembly that includes a threaded bolt 136, an optional washer 140, and a threaded nut 144. As further shown in the embodiment of FIG. 4, the bolt 136 is disposed in the combined aperture 92 such that a first end 148 of the fastener 80 comprising a first end of the bolt 136 is proximal the panel 60 and a second end 152 of the fastener 80 comprising a second end of the bolt 136 is proximal the inner casing 52. The fastener 80 includes three retaining members. In particular, a first retaining member in the form of a head 156 of the bolt 136 is in contact with the panel 60, as shown in FIG. 4. A second retaining member in the form of a shoulder 160 of the bolt 136 is in an interfering relationship with the first portion 120 of the surface 116. As further shown in FIG. 4, the shoulder 160 is disposed between the first end 148 of the fastener 80 and the first portion 120. Moreover, a third retaining member in the form of the optional washer and nut 140, 144 is/are in contact with the outer surface 104 of the inner casing 52. The nut 144 is threaded onto threads on the bolt 136 to a desirable level of torque. In this way, the fastener 80 tightly secures the panel 60 against the inner casing 52 such that an outer surface 162 of the panel 60 is in contact with the inner surface 64 of the inner casing. Preferably, the shoulder 160 is spaced a small distance or gap 168 from the first portion 120.

Figure 4A:
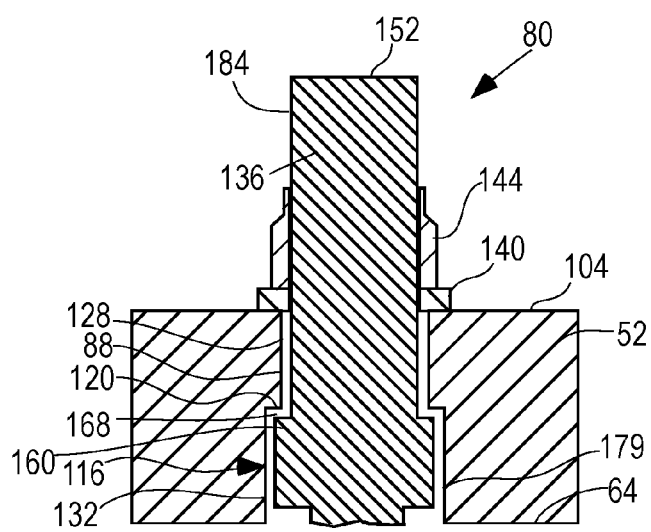
FIG. 4A is a fragmentary cross sectional view illustrating the fastener of FIG. 4, with a portion of the fastener sheared off.

Referring now to FIG. 4A, the head 156 of the bolt 136 may be sheared during a blade-out event where at least a portion of a fan blade 46 of the fan 28 becomes separated from the fan 28 and strikes one or more panels 60 or other components proximal the fan 28. Such blade-out events can occur due to a bird strike on the fan 28, because of other debris striking the fan 28, or for other reasons. The shearing of the bolt head 156 may be accompanied by shearing of some or all of the panel 60, or the panel 60 may otherwise separate from the inner casing 52. In the illustrated embodiment, substantially all of the panel 60 is sheared and the bolt 136 is sheared along the inner surface 64. As further shown in FIG. 4A, because the shoulder 160 is in an interfering relationship with the first portion 120, movement of the bolt 136 in a direction toward the second end 152 is restricted or limited such that at least a portion of the bolt 136 is retained in the combined aperture 92 after the head 156 is sheared. Moreover, it should be apparent that movement of the retained portion of the bolt 136 in a direction of the inner surface 64 is limited or restricted by the optional washer and nut 140, 144. In this way, air flow through the aperture 88 remains at least partially restricted even if the first member in the form of the panel 60 is sheared or separates from the second member in the form of the inner casing 52.

It is advantageous to retain at least a portion of the bolt 136 in the aperture 88 after the head 156 has sheared because there may be a hazardous fire in the space 58 between the inner casing 52 and the outer casing 56 (shown in FIG. 3), and impeding air flow through at least a portion of the aperture 88 reduces the amount of air that flows from inside the inner casing 52 through the aperture 88 to feed the hazardous fire. It should be noted here that a single blade-out event can cause shearing of multiple bolts 136 disposed in multiple combined apertures 92. Thus, the reduction in air flow through the aperture 88 may be multiplied by the number of sheared bolts 136. In this way, fire damage to the engine 20 is minimized, as is the possibility of injury to passengers of an aircraft that includes the engine 20.

After shearing, because of the gap 168, the bolt 136 may no longer be tightly secured within the aperture 88, as shown in FIG. 4A, and may move along the longitudinal extent 96. Such movement is limited by the shoulder 160 in one direction and the optional washer and nut 140, 144 in the opposite direction. The extent of the movement is dependent on the extent of the gap 168, which may vary between combined apertures 92 associated with different panels 60 or between different rotating structures. Such limited movement may be tolerable in certain environments because air flow through the aperture 88 is reduced despite such limited movement. Thus, for example, a one size bolt 136 can be installed in different sized combined apertures 92. As shown in FIG. 3, the combined apertures 92 associated with one panel 60 may have different longitudinal extents 96 because, for example, a thickness of the inner casing 52 may be variable. As further shown in FIG. 3, three bolts 136 having the same size extend through three combined apertures 92, 92-1, and 92-2, respectively. Each of the combined apertures 92, 92-1, and 92-2 has a different longitudinal extent 96, 96-1, and 96-2, respectively, thereby creating gaps 168, 168-1, and 168-2, respectively, where the gaps 168, 168-1, and 168-2 have different sizes along the longitudinal extent 96. The ability to install the same size bolt 136 in differently sized combined apertures 92 eliminates manufacturing costs associated with a custom-sized bolt 136 for each combined aperture 92. In fact, bolts 136 having one size may even be used to secure different panels 60.

Referring again to FIG. 4, a circumferential gap 179 about the shoulder 160 (e.g., between the shoulder 160 and the third portion 132 of the surface 116) may be relatively small so that the bolt 136 does not move excessively within the combined aperture 92 before shearing.

Referring again to FIG. 4, in the illustrated embodiment the bolt 136 includes a narrower portion 180 in the form of one or more grooves disposed between the first end 148 and the first portion 120. In the illustrated embodiment of FIG. 4, the narrower portion 180 is formed by a circumferential groove. In other embodiments, the narrower portion 180 may be formed by a single groove on one side of the bolt 136. Alternatively, the narrower portion 180 may be formed by multiple spaced grooves located on different sides of the bolt 136. Additionally, or alternatively, the narrower portion 180 may be formed by other voids resulting in a narrowing of the material of the bolt 136.

In the illustrated embodiment, the narrower portion 180 is narrower than the head 156, the shoulder 160, and a remaining portion 184 of the bolt 136. It should be noted that the head 156 is wider than the shoulder 160, which is, in turn, wider than at least a portion of the remaining portion 184. Referring next to FIG. 4A, this arrangement makes it likely that, upon shearing, the bolt 136 will fail somewhere along the narrower portion 180 instead of along the shoulder 160 or the remaining portion 184. The narrower portion 180 is, thus, preferentially frangible to obtain a high probability that at least a portion of the shoulder 160 remains in interfering relationship with the first portion 120 of the surface 116 after shearing, thereby retaining at least a portion of the bolt 136 in the aperture 88.

The narrower portion 180 need not occupy the entire length between the head 156 and the shoulder 160, nor need the narrower portion 180 be as long as shown in FIG. 4 along the longitudinal extent 96 to accomplish the function of being a preferential failure point. Thus, for example, a fastener 80a shown in FIG. 5 may have one or more narrower portions 180a that are shorter along the longitudinal extent 96 than the narrower portion(s) 180 of FIG. 4. As further shown in FIG. 5, the narrower portion 180a is disposed within the shoulder 160a, with portions of the shoulder 160a on either side of the narrower portion 180a. The narrower portion 180a is satisfactory to perform the function of locating the likely shearing point, and the bolt 136a may be less expensive to manufacture than the bolt 136 of FIG. 4.

The bolt 136 of FIG. 4, however, may have other advantages. For example, the long narrower portion(s) 180 of the bolt 136 provides space for adjustment of the panel 60 in a direction transverse to the longitudinal extent 96 before final tightening of the nut 144 to the desirable level of torque. It may be convenient, for example, to partially tighten the nut 144 such that the panel 60 is partially secured to the inner casing 52 (and thus, prevented from falling down toward a center of the fan 28, for example) but not tighten the nut 144 so much that the panel 60 is immovable in a direction transverse to the longitudinal extent 96. Adjustment of the panel 60 may be useful during the installation of other panels 60 or other components of the engine 20. Finally, after the panel 60 is desirably positioned and no longer requires adjustment, the nut 144 can be tightened to the desirable level of torque. In this way, the narrower portion 180, which has a longitudinal extent greater than a thickness of the panel 60, may facilitate installation of the panel 60.

Figure 6A:
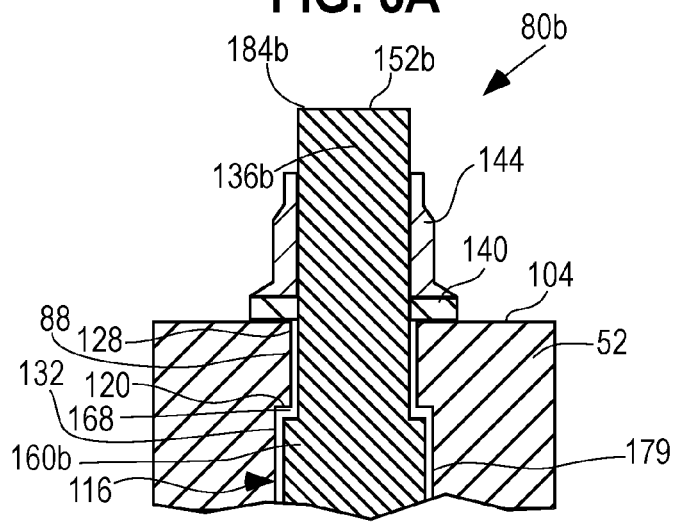
FIGS. 6A, and 7A are views similar to FIG. 4A illustrating the fasteners of FIGS. 6, and 7, respectively, with portions sheared off.

In some embodiments, a bolt 136b may not include any narrower portion(s), for example, as shown in FIG. 6. Because of the absence of a narrower portion, the bolt 136b may be easier to manufacture than either the bolt 136 of FIG. 4 or the bolt 136a of FIG. 5. The bolt 136b may be useful, for example, in embodiments where there is not a strong need to locate a failure point because there already exists a likely failure point for other reasons. For example, a portion of a blade 46 of the fan 28 may be travelling at such high speeds during a blade-out event that the bolt 136b is likely to be sheared at approximately the level of the inner surface 64, where the errant blade 46 is likely to strike, as shown in FIG. 6A. In the illustrated embodiment of FIG. 6A, the errant blade 46 has also broken-off substantially the whole panel 60 because the blade 46 has struck at approximately along the inner surface 64.

Figure 7:
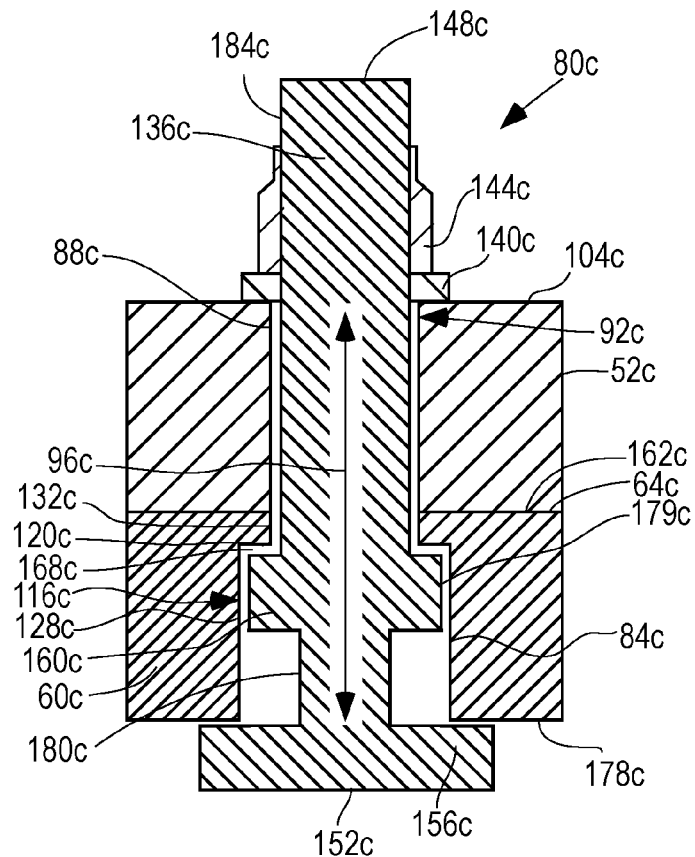

Referring now to FIG. 7, an inner casing 52c is secured to a panel 60c by a fastener 80c. Referring again to FIG. 7, the fastener 80c extends through aligned apertures 84c, 88c in the panel 60c and the inner casing 52c, respectively. As further shown in FIG. 7, the aperture 88c is aligned with the aperture 84c to define a combined aperture 92c having a longitudinal extent 96c. More specifically, the aperture 84c in the panel 60c extends between a first face in the form of a radially outer surface 162c and a second face in the form of a radially inner surface 178c of the panel 60c and is defined by a surface 116c. The surface 116c includes a first portion 120c, a second portion 128c, and a third portion 132c. The first portion 120c has an extent transverse to the longitudinal extent 96c, as shown in FIG. 7. The second portion 128c has a longitudinal extent at least substantially coincident with the longitudinal extent 96c and is disposed between the first portion 120c and the inner surface 178c. The third portion 132c has a longitudinal extent at least substantially coincident with the longitudinal extent 96c and is disposed between the first portion 120c and the outer surface 162c of the panel 60c.

As further shown in FIG. 7, the fastener 80c is a bolt-nut type assembly that includes a threaded bolt 136c, an optional washer 140c, and a threaded nut 144c. As further shown in the embodiment of FIG. 7, the bolt 136c is disposed in the combined aperture 92c such that a first end 148c of the fastener 80c comprising a first end of the bolt 136c is proximal the inner casing 52c and a second end 152c of the fastener 80c comprising a second end of the bolt 136c is proximal the panel 60c. The fastener 80c includes three retaining members. In particular, a first retaining member in the form of the optional washer and nut 140c, 144c is/are in contact with the outer surface 104c of the inner casing 52c. A second retaining member in the form of a shoulder 160c of the bolt 136c is in an interfering relationship with the first portion 120c of the surface 116c. Moreover, the shoulder 160c is disposed between the second end 152c and the first portion 120c. Additionally, a third retaining member in the form of a head 156c of the bolt 136c is in contact with the panel 60c. Preferably, the shoulder 160c is spaced a small distance or gap 168c from the first portion 120c.

Figure 7A:
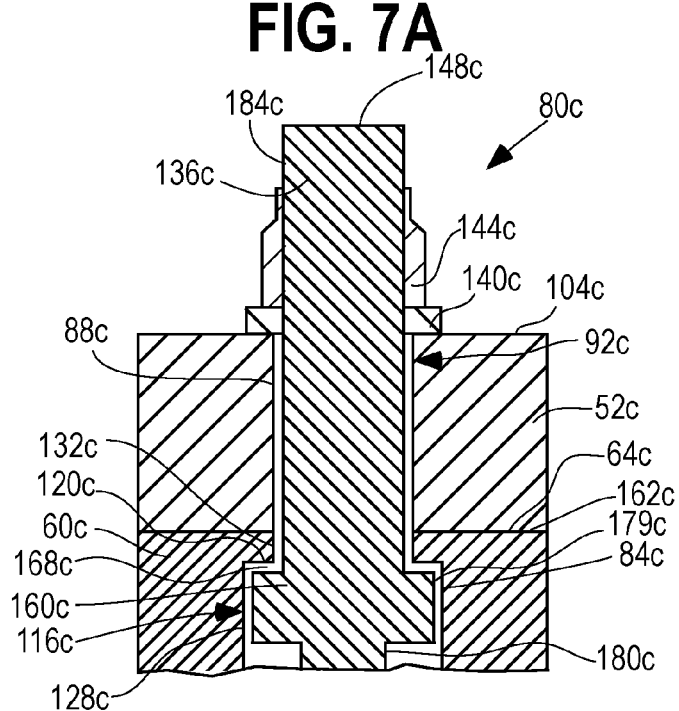

The head 156c of the bolt 136c may be sheared, as shown in FIG. 7A, because of a blade-out event of the type described above. As shown in FIG. 7A, because the shoulder 160c is in an interfering relationship with the first portion 120c, movement of the bolt 136c in a radially outward direction (i.e., a direction toward the first end 148c) is restricted or limited such that at least a portion of the bolt 136c is retained in the combined aperture 92c after the head 156c is sheared. Moreover, it should be apparent that movement of the retained portion of the bolt 136c in a radially inward direction (i.e., a direction away from the first end 148c) is limited or restricted by the optional washer and nut 140c, 144c. In this way, air flow through the combined aperture 88c remains at least partially restricted even if a portion of a second member in the form of a portion of the panel 60c is sheared or separates from a first member in the form of the inner casing 52c. Such a restriction on air flow may be advantageous for the reasons described above with respect to the hazardous fire associated with FIG. 3.

After shearing, in addition to accomplishing the purpose of reducing air flow through the aperture 92c, the bolt 136c also maintains securement between the first member in the form of the inner casing 52c and a portion of the second member in the form of a portion of the panel 60c. Such securement between the first and second member is maintained because the first portion 120c of the surface 116c and the second retaining member (i.e., shoulder 160c) are disposed in or associated with the aperture 84c in the panel 60c instead of the aperture 88c in the inner casing 52c. The bolt 136c and aperture 92c may be most appropriate for an application where it is relatively important to maintain securement between at least a portion of the first and second members. A disadvantage of the bolt 136c and the aperture 92c is that if shearing occurs along the level of the inner surface 64c of the inner casing 52c, the shoulder 160c and the first portion 120c would be sheared off and the bolt 136c would be free to be ejected from the aperture 92c in a direction of the first end 148c. Such an outcome would allow air flow through the aperture 92c in a relatively unrestricted manner, which may be harmful in certain applications, as described above with respect to the hazardous fire associated with FIG. 3.

It should be noted here that the gap 168c may exist because of manufacturing limitations similar to the manufacturing limitations described above with respect to FIGS. 3-4A. Moreover, allowing the gap 168c to have variable length has advantages including being able to use a one size bolt 136c for different sized apertures 92c, similar to the advantages described above with respect to FIGS. 3-4A. It may not, however, be tolerable to allow the gap 168c to be as long as the gap 168 of FIGS. 3-4A because a too-long gap 168c may not adequately secure the remaining portion of the panel 60c to the inner casing 52c after shearing.

Referring again to FIG. 7, the bolt 136c includes a narrower portion 180c in the form of a groove disposed between the second end 152c and the first portion 120c. The narrower portion 180c may be similar to the narrower portion 180 described above with respect to FIGS. 4-5 and may have similar alternative embodiments. As shown in FIG. 7A, the narrower portion 180c being narrower than the rest of the bolt 136c makes it likely that, upon shearing, the bolt 136c will fail somewhere along the narrower portion 180c instead of elsewhere on the bolt 136c. The narrower portion 180c is, thus, preferentially frangible to obtain a high probability that at least a portion of the shoulder 160c will be in interfering relationship with the first portion 120c of the surface 116c after shearing, thereby retaining at least a portion of the bolt 136c in the aperture 88c (and thereby maintaining securement between the inner casing 52c and a portion of the panel 60c), as further shown in FIG. 7A. It should be noted that, in the illustrated embodiment, the head 156c is wider than the shoulder 160c, which is, in turn, wider than at least a portion of the bolt 136c disposed within the aperture 88c.

Figure 8:
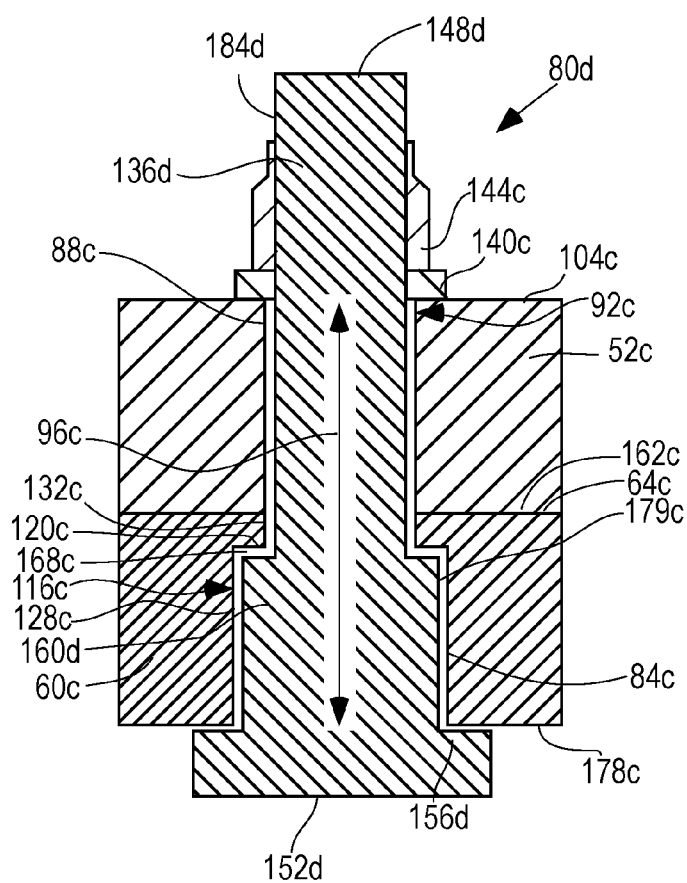

In some embodiments having the first portion 120c in the aperture 84c of the panel 60c, a bolt 136d may not include a narrower portion, as shown in FIG. 8, which shows the combined aperture 92c of FIG. 7 with a different bolt 136d extending through the combined aperture 92c. Because of the absence of the narrower portion, the bolt 136d may be easier to manufacture than the bolt 136c of FIG. 7. The bolt 136d may be useful, for example, for applications where there is not a strong need to locate a failure point because there already exists a likely failure point for other reasons.

It should be noted that the first and second members secured by a fastener may be other components of the engine 20 besides the inner casing 52 and the panel 60. These other components include turbine flanges, other structural flanges, bearing assemblies, components in a hub of the engine 20 such as a bearing housing, or the like. It should be further noted that the embodiments disclosed herein may be used in or with any rotating machine including the illustrated gas turbine engine, or other turbomachinery including a turbofan engine, a turbojet engine, a turboshaft engine, a jet prop engine, etc., as well as non-turbomachinery such as a water pump, a turbocharger, a heating/cooling compressor, or the like.

The bolts 136 through 136d described above may be made of a metal such as A286 steel, titanium 6-4, and/or a nickel based alloy such as MP 159 or Waspaloy. In some embodiments, the bolts 136 through 136d may be made of non-metallic materials. For example, the bolts 136 through 136d may be made of plastic, and optionally, may be made using a 3D printing process. Additionally, or alternatively, a washer and a nut associated with the bolts 136 through 136d may be made of non-metallic materials including, but not limited to, nylon.

In some embodiments, the fasteners 80-80d described above may be utilized to secure three members to one another by extending the fasteners 80 through a combined aperture defined by the three members. In some such embodiments, at least a portion of the fasteners 80-80d would be retained in the combined aperture after shearing of the fastener 80 at a level of at least a portion of one of the three members. The retained portion of the fasteners 80-80d may continue to secure two of the three members to one another or may continue to secure the three members to one another.

In other embodiments, one or both of the first and third retaining members associated with the fasteners 80-80d comprises an optional washer 140 and a nut 144. Additionally, or alternatively, the second retaining member may comprise an optional washer 140 and a nut 144.

INDUSTRIAL APPLICABILITY

One may possibly employ different retention techniques and structures so that a sheared bolt 136 is reliably retained in its associated aperture 92, although the suitability of some techniques and structures may be limited because of the particular environment. For example, one could retain a portion of the bolt 136 in the aperture 88 using alternative methods such as an adhesive, a swaged-in feature, or a nut-plate. However, using an adhesive to glue the bolt 136 to a surface 116 of the aperture 88 may be problematic in a gas turbine engine because the high temperatures generated by the hazardous fire may melt the adhesive and allow the bolt 136 to escape the aperture 88. Thus, mechanical retention is more likely in such an environment to be effective than adhesive retention. Using a swaged-in feature may not be acceptable because a moving blade 46 of a gas turbine engine striking the swaged-in feature may cause failure thereof. Another problem with swaged-in retention features is that these features may require tight tolerances that increase part scrap rate associated with designing and manufacturing the inner casing 52. Moreover, using a nut-plate in such a gas turbine engine may not be possible because of the large thickness of the inner casing 52. Nevertheless, such alternatives or other alternatives may be employed in appropriate circumstances.

In summary, a fastener and a combined aperture having a certain shape reduces air flow through the combined aperture after shearing and/or maintains securement of a first member to a second member after shearing. Such a reduction of air flow assists in containing a hazardous fire.

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and similar references in the context of describing the invention (especially in the context of the following claims) are to be construed to cover both the singular and the plural, unless otherwise indicated herein or clearly contradicted by context. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the disclosure and does not pose a limitation on the scope of the disclosure unless otherwise claimed. No language in the specification should be construed as indicating any non-claimed element as essential to the practice of the disclosure. Numerous modifications to the present disclosure will be apparent to those skilled in the art in view of the foregoing description. It should be understood that the illustrated embodiments are exemplary only, and should not be taken as limiting the scope of the disclosure.

We claim:
1. An apparatus, comprising:
a first member having a first aperture;
a second member adjacent to the first member and having a second aperture extending between opposed first and second faces of the second member and aligned with the first aperture to define a combined aperture having a longitudinal extent, the second aperture being defined by a surface having a portion, the portion having an extent transverse to the longitudinal extent; and
at least a portion of a fastener disposed in the combined aperture, the fastener having a first end proximal the first member and a second end proximal the second member, the fastener including a first retaining member in contact with the first member, a second retaining member in interfering relationship with the portion of the surface defining the second aperture, a third retaining member in contact with the second face, and a frangible portion disposed between the first and the second retaining members,
wherein the first retaining member is wider than the first aperture, the second retaining member is narrower than the first aperture, the third retaining member is wider than a remaining portion of the fastener between the third retaining member and the second end, and the second retaining member is adapted to remain in the interfering relationship with the portion of the surface defining the second aperture when the fastener is broken at the frangible portion.

2. The apparatus of claim 1, wherein the second retaining member is disposed between the first end and the portion having an extent transverse to the longitudinal extent.

3. The apparatus of claim 2, wherein the first retaining member is wider than the second retaining member.

4. The apparatus of claim 2, wherein the fastener includes a bolt and the second retaining member is wider than the remaining portion.

5. An apparatus, comprising:
a first member having a first aperture;
a second member adjacent to the first member and having a second aperture extending between opposed first and second faces of the second member and aligned with the first aperture to define a combined aperture having a longitudinal extent, the second aperture being defined by a surface having a portion, the portion having an extent transverse to the longitudinal extent; and
at least a portion of a fastener disposed in the combined aperture, the fastener having a first end proximal the first member and a second end proximal the second member, the fastener including a first retaining member in contact with the first member, a second retaining member in interfering relationship with the portion of the surface defining the second aperture, a third retaining member in contact with the second face,
wherein the fastener includes a bolt, the bolt having a remaining portion extending between the second retaining member and the second end, wherein the first retaining member is wider than the first aperture, the second retaining member is narrower than the first aperture, and the second and third retaining members are wider than the remaining portion,
wherein tightening of the third retaining member causes the first retaining member to contact the first member before the second retaining member contacts the portion of the surface having an extent transverse to the longitudinal extent.

6. The apparatus of claim 2, wherein the fastener further comprises a portion disposed between the first end and the portion of the surface having an extent transverse to the longitudinal extent that is narrower than the portion of the fastener between the third retaining member and the second end.

7. The apparatus of claim 1, wherein the second retaining member is disposed between the second end and the portion having an extent transverse to the longitudinal extent.

8. The apparatus of claim 1 being a turbine engine wherein the second member is a casing surrounding a fan and the first member is a panel secured to the casing by the fastener.

9. The apparatus of claim 1, wherein at least a portion of the fastener is retained in the second aperture after shearing of the fastener along the first face of the second member.

10. An apparatus, comprising:
a first member having a first aperture;
a second member adjacent to the first member and having a second aperture extending between opposed first and second faces of the second member and aligned with the first aperture to define a combined aperture having a longitudinal extent, the second aperture being defined by a surface having a portion, the portion having an extent transverse to the longitudinal extent; and
at least a portion of a fastener disposed in the combined aperture, the fastener having a first end proximal the first member and a second end proximal the second member, the fastener including a first retaining member in contact with the first member, a second retaining member in interfering relationship with the portion of the surface, and a third retaining member in contact with the second face, and a frangible portion disposed between the first and the second retaining members,
wherein at least one of the first and third retaining members includes a nut, the first retaining member is wider than the first aperture, the second retaining member is narrower than the first aperture, the third retaining member is wider than a remaining portion between the third retaining member and the second end, and the second retaining member is adapted to remain in the interfering relationship with the portion of the surface defining the second aperture when the fastener is broken at the frangible portion.

11. The apparatus of claim 10, wherein the second retaining member is disposed between the first end and the portion having an extent transverse to the longitudinal extent.

12. The apparatus of claim 10, wherein the second retaining member is disposed between the second end and the portion having an extent transverse to the longitudinal extent.

13. The apparatus of claim 12, wherein tightening of the first retaining member causes the third retaining member to contact the second member before the second retaining member contacts the portion having an extent transverse to the longitudinal extent.

14. The apparatus of claim 12, wherein the fastener further comprises a portion disposed at least partially between the second end and the portion of the surface having an extent transverse to the longitudinal extent that is narrower than a portion of the fastener between the third retaining member and the second end.

15. The apparatus of claim 12 being a turbine engine wherein the first member is a casing surrounding a fan and the second member is a panel secured to the casing by the fastener.

16. A method of securing a first member to a second member, the method comprising:
providing a first member having a first aperture;
providing a second member having a second aperture such that the first aperture is aligned with the second aperture;
securing the first member to the second member by a fastener that extends through the first and second apertures, wherein the fastener includes first retaining member in contact with a surface of the first member and a second retaining member in interfering relationship with a surface of the second member;
forming a frangible portion on the fastener between the first and the second retaining members, wherein the second retaining member is adapted to remain in the interfering relationship with the surface of the second member when the fastener is broken at the frangible portion; and
restricting, by the fastener, fluid flow through the second aperture such that the fluid flow through the second aperture remains at least partially restricted when the first member separates from the second member.

17. The method of claim 16, wherein the second member is a casing associated with a fan of a turbine engine and the first member is a panel disposed radially inwardly from the casing.

18. The method of claim 17, wherein the fastener includes a bolt, the first retaining member comprises a head, the second retaining member comprises a shoulder, and the bold comprises a remaining portion, wherein the shoulder is wider than the remaining portion and the head is wider than the shoulder.

19. The method of claim 18, wherein the shoulder is disposed at least partially in the second aperture of the second member.

20. The method of claim 18, wherein the bolt further includes a narrower portion, the remaining portion being wider than the narrower portion.

* * * * *